United States Patent
Liu et al.

(10) Patent No.: US 10,156,446 B2
(45) Date of Patent: Dec. 18, 2018

(54) FACILITY WAYFINDING SYSTEM

(71) Applicant: MappedIn Inc., Kitchener (CA)

(72) Inventors: Hongwei Liu, Kitchener (CA);
Leander Lee, Brampton (CA); Mitchell Butler, Halifax (CA); Erkang Wei, Waterloo (CA)

(73) Assignee: MappedIn Inc., Waterloo (CA)

( * ) Notice: Subject to any disclaimer, the term of this patent is extended or adjusted under 35 U.S.C. 154(b) by 62 days.

(21) Appl. No.: 15/631,516

(22) Filed: Jun. 23, 2017

(65) Prior Publication Data
US 2017/0284811 A1    Oct. 5, 2017

Related U.S. Application Data

(63) Continuation-in-part of application No. 13/852,304, filed on Mar. 28, 2013, now Pat. No. 9,702,706.

(60) Provisional application No. 61/733,078, filed on Dec. 4, 2012.

(51) Int. Cl.
| | |
|---|---|
| G01C 21/20 | (2006.01) |
| H04L 29/08 | (2006.01) |
| H04W 4/04 | (2009.01) |
| G06F 17/30 | (2006.01) |
| G06Q 30/02 | (2012.01) |

(52) U.S. Cl.
CPC ....... *G01C 21/206* (2013.01); *G06F 17/3087* (2013.01); *G06F 17/30241* (2013.01); *G06Q 30/0259* (2013.01); *G06Q 30/0261* (2013.01); *H04L 67/02* (2013.01); *H04W 4/04* (2013.01)

(58) Field of Classification Search
None
See application file for complete search history.

(56) References Cited

U.S. PATENT DOCUMENTS

| | | | |
|---|---|---|---|
| 8,254,961 | B2 | 8/2012 | Moon et al. |
| 8,259,692 | B2 | 9/2012 | Bajko |
| 8,320,939 | B1 | 11/2012 | Vincent |
| 8,350,758 | B1 | 1/2013 | Parvizi et al. |
| 8,712,688 | B2 | 4/2014 | Forte et al. |
| 2006/0247849 | A1 | 11/2006 | Mohsini et al. |
| 2007/0225911 | A1 | 9/2007 | Chanick |

(Continued)

OTHER PUBLICATIONS

Wikimedia Foundation Inc., "Uniform Resource Identifier", downloaded from https://en.wikipedia.org/wiki/Uniform_resource_identifier, Jul. 2015.

(Continued)

*Primary Examiner* — Mussa A Shaawat
*Assistant Examiner* — Michael V Kerrigan
(74) *Attorney, Agent, or Firm* — Own Innovation

(57) ABSTRACT

A facility wayfinding system is provided which includes an interactive public display device and a mobile device, running a mobile wayfinding application. The interactive public display device, which is situated at a first location within a facility, displays a facility map showing facility units, receives a user selection of a facility unit as a second location, and displays a route from the first location to the second location on the facility map. The mobile device also displays the facility map, displays a route from a start location to a destination location on the facility map, and updates the start location to the first location and the destination location to the second location by synchronizing with the interactive public display device.

20 Claims, 5 Drawing Sheets

(56) References Cited

U.S. PATENT DOCUMENTS

| | | |
|---|---|---|
| 2009/0216438 A1 | 8/2009 | Shafer |
| 2011/0022468 A1 | 1/2011 | Muster et al. |
| 2012/0028654 A1 | 2/2012 | Gupta et al. |
| 2012/0066035 A1 | 3/2012 | Stranger et al. |
| 2012/0130762 A1 | 5/2012 | Gale et al. |
| 2012/0295632 A1 | 11/2012 | Karlsson et al. |
| 2015/0154643 A1 | 6/2015 | Artman et al. |

OTHER PUBLICATIONS

International Search Report and Written Opinion for PCT/CA2013/000297, dated May 27, 2013.

Kaviana, et al., "What goes where? Designing interactive large public display applications for mobile device nteraction", ACM ICIMCS, Nov. 2009.

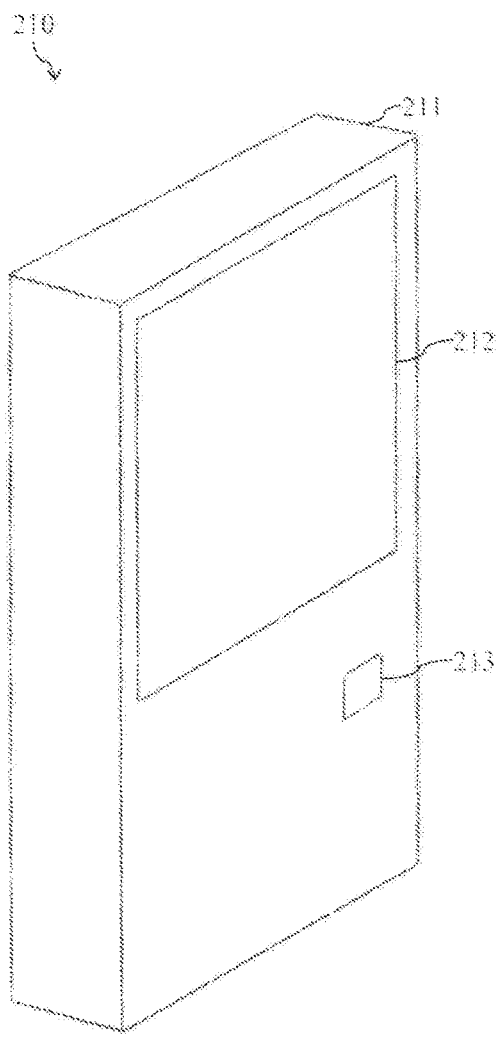
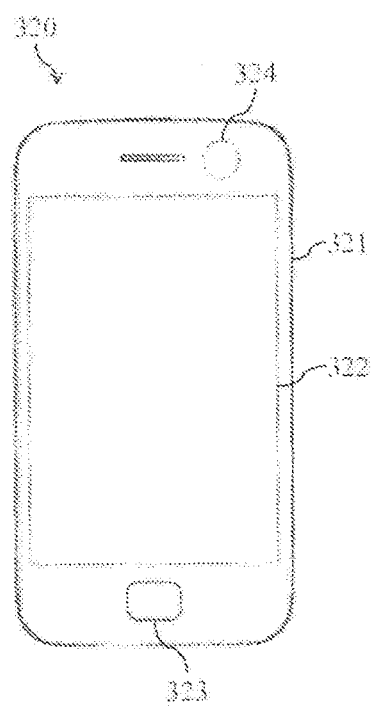
FIG. 2
FIG. 3
PRIOR ART

FACILITY WAYFINDING SYSTEM

CROSS-REFERENCE TO RELATED APPLICATIONS

This application is a continuation-in-part of U.S. patent application Ser. No. 13/852,304, filed on Mar. 28, 2013, which claims the benefit of U.S. Provisional Patent Application No. 61/733,078, filed on Dec. 4, 2012, both of which are incorporated herein by reference.

TECHNICAL FIELD

The present application relates to wayfinding and more specifically to wayfinding within a facility, i.e., facility wayfinding.

INTRODUCTION

Recent advancements in technology have transformed the ways in which people orient themselves and navigate from place to place, i.e., wayfinding. For instance, technologies such as global positioning system (GPS)-enabled devices and map applications have made outdoor wayfinding more convenient and accurate.

However, fewer advancements have been made in technology relating to wayfinding within a facility, i.e., facility wayfinding. Typically, static physical signs and directories are used for wayfinding within facilities. Such signs and directories are expensive to update and provide limited wayfinding information.

In attempts to improve facility wayfinding, some facilities have developed standalone mobile wayfinding applications. However, these mobile wayfinding applications are, generally, facility-specific. Unfortunately, visitors to a facility are often reluctant to install a mobile wayfinding application useful for only that facility on their mobile devices, e.g., mobile phones. Furthermore, these mobile wayfinding applications, generally, rely on signal-based localization of the mobile device for routing. Unfortunately, localization based on signals, e.g., GPS or WiFi signals, may be inaccurate or may require an additional localization system.

Other facilities have installed stand-alone interactive public display devices, i.e., digital directories. However, these interactive public display devices are fixed at a particular location within the facility. Once visitors leave that location, they must rely on their memory or, in some instances, a printout to recall wayfinding information provided by the interactive public display device.

A facility wayfinding system including both a mobile wayfinding application and an interactive public display device is disclosed in U.S. Patent Application Publication No. 2011/0022468 to Muster et al., published on Jan. 27, 2011, which is incorporated herein by reference. The mobile wayfinding application, like previous stand-alone mobile wayfinding applications, relies on signal-based localization of the mobile device for routing. Furthermore, the interactive public display device, like previous interactive public display devices, relies on printouts to provide visitors with a record of wayfinding information. Therefore, an improved facility wayfinding system is desirable.

SUMMARY

Accordingly, one aspect of the present invention relates to a wayfinding system for a facility including multiple facility units, the wayfinding system comprising: an interactive public display device, situated at a first location within the facility, configured to: present a public user interface on a display of the public display device; display a facility map, showing the facility units, via the public user interface; receive a user selection of a facility unit as a second location, via the public user interface; and display a route from the first location to the second location on the facility map, via the public user interface; and a mobile wayfinding application executable by a mobile device to configure the mobile device to: present a mobile user interface on a display of the mobile device; display the facility map, via the mobile user interface; display a route from a start location to a destination location on the facility map, via the mobile user interface; and update the start location to the first location and the destination location to the second location by synchronizing with the public display device.

Another aspect of the present invention relates to an interactive public display device for integration into a wayfinding system for a facility including multiple facility units, the public display device situated at a first location within the facility and comprising: a display; a processor configured to: present a public user interface on the display of the public display device; display a facility map, showing the facility units, via the public user interface; receive a user selection of a facility unit as a second location, via the public user interface; and display a route from the first location to the second location on the facility map, via the public user interface; and a synchronization feature configured to enable a mobile device to synchronize with the public display device, so that the mobile device is configured to display the route from the first location to the second location on the facility map, via a mobile user interface presented on a display of the mobile device.

Yet another aspect of the present invention relates to a mobile wayfinding application for integration into a wayfinding system for a facility including multiple facility units, the mobile wayfinding application embodied in a non-transitory computer-readable storage medium and executable by a processor of a mobile device to configure the mobile device to: present a mobile user interface on a display of the mobile device; display a facility map, showing the facility units, via the mobile user interface; display a route from a start location to a destination location on the facility map, via the mobile user interface; and update the start location to the first location and the destination location to the second location by synchronizing with an interactive public display device, wherein the public display device is situated at the first location within the facility, and wherein a selection state of the public display device includes a user selection of the second location According to some embodiments, there is a facility device configured to present a user interface on a display of the facility device; display a facility map showing facility units via the public user interface; receive a first location and a second location via the user interface, the second location corresponding to a facility unit of the facility units; display a route from the first location to the second location on the facility map via the user interface; and receive a uniform resource locator (URL) from a backend system comprising an identifier associated with the route; and a mobile device configured to present a mobile user interface on a display of the mobile device; receive the URL from the facility device; via the URL, provide the identifier to the backend system; receive, from the backend system, the first location and the second location; update a start location to the first location and a destination location to the second location; display the facility map via the mobile user interface; and display the route from the start location to the destination location on the facility map via the mobile user interface.

The facility may be an indoor facility.

The facility device may be further configured to provide a promotional item relating to the facility unit via the user interface; and wherein the mobile device is further configured to receive the promotional item from the facility device.

The wayfinding system may further include the backend system, wirelessly connected to the facility device and the mobile device, configured to provide the facility map to the facility device and the mobile device; provide the route from the first location to the second location to the facility device; and provide the route from the start location to the destination location to the mobile device.

The identifier uniquely identifies the public display device among multiple interactive public display devices.

The backend system may be further configured to store identifiers, locations, and current selection states for the facility device.

The backend system may be further configured to provide the first location and the second location to the mobile device upon receipt of the identifier.

The backend system may be further configured to store identifiers, locations, and current selection states for the facility device; and use the identifier to identify the facility device and to retrieve the current selection state for the facility device, wherein the current selection state includes the first location and the second location.

The wayfinding system may further include a geographical information system (GIS), hosted internally by the backend system or supplied externally to the backend system, configured to: store the facility map and associated facility metadata; and the destination location.

The public display device may be further configured to display a facility directory, listing the facility units, via the public user interface; wherein the mobile device is further configured to display the facility directory, via the mobile user interface; and wherein the backend system is further configured to provide the facility directory to the public display device and the mobile device.

The public display device may be configured to display the facility map and the facility directory on a same screen of the public user interface; and wherein the mobile device is configured to display the facility map and the facility directory on different screens of the mobile user interface.

The display of the public display device may be a touchscreen display; and wherein the public display device may be configured to receive the user selection by detecting a user touch on a facility unit on the facility map or in the facility directory.

The facility device may be configured to provide the first location and the second location to the backend system.

The facility device may be configured to receive the first location and the second location as a user selection.

The backend system may be configured to provide the first location and the second location to the mobile device upon receipt of the identifier.

According to some embodiments, there is a non-transitory computer-readable storage medium having stored thereon computer-executable instructions that, when executed by a processor of a mobile device, cause the processor of a mobile device to execute a mobile wayfinding application for integration into a wayfinding system for a facility including multiple facility units, wherein the mobile wayfinding application causes the mobile device to present a mobile user interface on a display of the mobile device; display a facility map, showing the facility units, via the mobile user interface; display a route from a start location to a destination location on the facility map, via the mobile user interface; receive a uniform resource locator (URL), the URL comprising an identifier associated with the route to obtain, from a backend system, a first location and a second location, wherein the mobile device is situated at the first location within the facility, and the second location comprises a location of a facility unit selected by a user of the mobile device; and update the start location to the first location and the destination location to the second location upon obtaining the first location and the second location from the backend system.

According to some embodiments, there is a facility device for a facility including multiple facility units, the facility device configured to present a user interface on a display of the facility device; display a facility map showing facility units via the public user interface; receive a first location and a second location via the user interface, the second location corresponding to a facility unit of the facility units; display a route from the first location to the second location on the facility map via the user interface; and receive a uniform resource locator (URL) from a backend system comprising an identifier associated with the route.

The facility device may be wirelessly connected to a mobile device, wherein the mobile device is configured to: present a mobile user interface on a display of the mobile device; receive the URL from the facility device; via the URL, provide the identifier to the backend system; receive, from the backend system, the first location and the second location; update a start location to the first location and a destination location to the second location; display the facility map via the mobile user interface; and display the route from the start location to the destination location on the facility map via the mobile user interface.

The facility device may be further configured to provide a promotional item relating to the facility unit via the user interface; and wherein the mobile device is further configured to receive the promotional item from the facility device.

The facility device may be wirelessly connected to the backend system, and the backed system is configured to: provide the facility map to the facility device and the mobile device; provide the route from the first location to the second location to the facility device; and provide the route from the start location to the destination location to the mobile device.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 2 is a schematic illustration of an exemplary interactive public display device, in accordance with an embodiment;

FIG. 3 is a schematic illustration of a prior-art mobile device for running a mobile wayfinding application, in accordance with an embodiment;

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The present specification provides wayfinding system for a facility including multiple facility units, i.e., a facility wayfinding system. The wayfinding system is not restricted to a single facility, but may be extended to multiple facilities of the same type and/or different types, each including multiple facility units.

The wayfinding system allows users, e.g., visitors to the facility, to orient themselves and to navigate from place to place within the facility, enabling them to find what they are looking for and to discover things around them. For example, a shopper at a mall can use the wayfinding system to search for a particular store or a particular item, e.g., shoes, to navigate to the relevant location, and/or to look at the current promotions.

The facility may be any type of facility. Typically, the facility is a commercial facility or an institutional facility. For example, the facility may be a retail facility, e.g., a mall or a shopping center, an office facility, e.g., an office building, an event facility, e.g., a conference center or a theme park, a transportation facility, e.g., an airport, an educational facility, e.g., a school or a university campus, or a medical facility, e.g., a hospital. The facility may be an indoor or an outdoor facility. However, the wayfinding system is particularly useful for indoor facilities.

The facility units may be any type of facility units, and the facility may include different types of facility units. Typically, the facility units are commonly managed as part of the facility. For example the facility units may be stores, restaurants, booths, offices, rooms, halls, washrooms, airport gates, and/or locations or areas within the facility.

Figure 1:
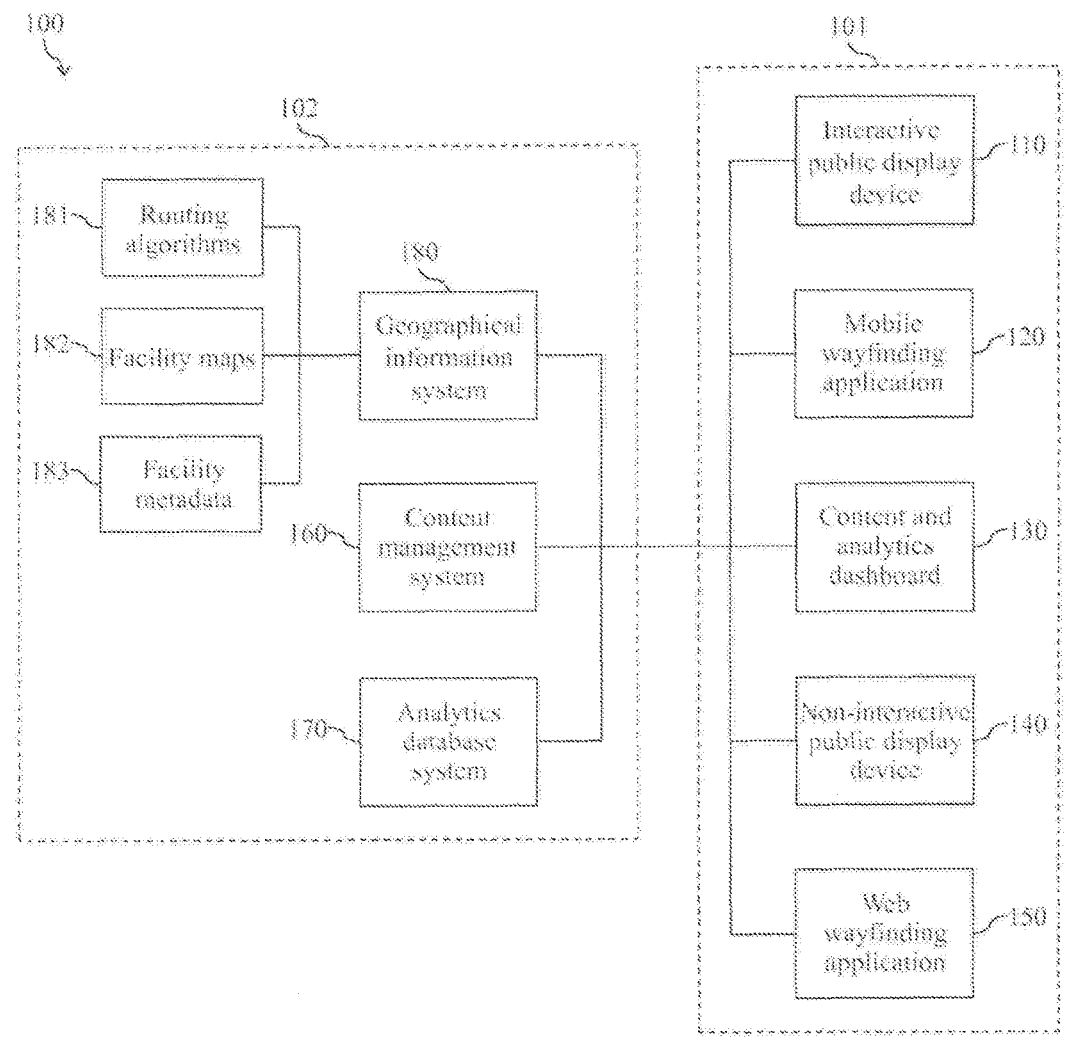
FIG. 1 is a block diagram of an exemplary facility wayfinding system, in accordance with an embodiment.

With reference to FIG. 1, an exemplary embodiment of the wayfinding system 100 includes a variety of user-facing components 101 all supported by a common backend system 102. Advantageously, by using a common backend system 102 for all the user-facing components 101, system speed is increased and infrastructure costs are reduced. The user-facing components 101 and the backend system 102 are operatively connected, typically, via the Internet. The individual connections may be wired or wireless connections.

Preferably, the user-facing components 101 and the backend system 102 communicate asynchronously, for example, by using an implementation of the WebSocket protocol, such as Socket.IO. Updates are, preferably, sent from the backend system 102 to each of the user-facing components 101 in real time as interrupts, i.e., without polling. Likewise, user interaction data is, preferably, sent from each of the user-facing components 101 to the backend system 102 in real time as interrupts, i.e., without polling.

The user-facing components 101 include an interactive public display device 110, i.e., a digital directory, a mobile wayfinding application 120, a content and analytics dashboard 130, a non-interactive public display device 140, i.e., a digital sign, and a web wayfinding application 150.

Although a single instance of each of the user-facing components 101 is illustrated in FIG. 1, the wayfinding system 100 may include multiple instances of each of the user-facing components 101. The backend system 102 includes a content management system (CMS) 160, an analytics database system 170, and a geographical information system (GIS) 180.

Note that other embodiments may omit some of these components or systems and/or include additional components or systems. For example, the wayfinding systems 100, 500 are customizable for the type of facility. Also, different types of facilities have different needs, and the wayfinding systems 100, 500 may be customized to suit those needs. Each of the user-facing components 101 may be customized in terms of the appearance of the user interfaces and the types of information displayed via the user interfaces. For example, for a convention center, a consistent color theme may be selected for the user interfaces, and background information about speakers and/or seminar information may be displayed.

In general, the interactive public display device 110 and the non-interactive public display device 140 each include a processor, memory, and a network interface card. These devices, specifically, the processors thereof, are configured by applications mentioned hereafter to execute the actions described hereafter. In general, the mobile wayfinding application 120, the content and analytics dashboard 130, the CMS 160, the analytics database system 170, and the GIS 180 each run on devices including a processor, memory, and a network interface card, and thereby, configure the devices, specifically, the processors thereof, to execute the actions described hereafter. The applications are, generally, embodied in non-transitory computer-readable storage media, typically, device memories, and are executable by device processors.

The interactive public display device 110 is situated at a particular location within the facility. Typically, the interactive public display device 110 is fixed or mounted at the particular location. Preferably, the interactive public display device 110 is provided with an identifier, e.g., a serial number, which uniquely identifies the interactive public display device 110 among multiple interactive public display devices 110 situated at different locations within the same and/or different facilities.

The interactive public display device 110 may have a variety of designs depending on its location. For example, the interactive public display device 110 may have a free-standing kiosk design or a wall-mounted design. In addition to a processor, memory, and a network interface card, the interactive public display device 110 includes a display and, preferably, a synchronization feature.

The display of the interactive public display device 110 is a large-screen display adapted for public viewing. For example, the display may have a diagonal screen size of greater than 30" (76 cm). Typically, the display is a touch-screen display, e.g., a capacitive touch-screen display. For example, the display may be a liquid crystal display (LCD) with an integrated or separate touch-sensing mechanism. In some instances, the interactive public display device 110 may include a separate input device, e.g., a touchpad, one or more keys, and/or a keyboard, in addition to or instead of a touch-screen display.

The synchronization feature is, typically, an external, scannable, i.e., machine-readable, feature. For example, the synchronization feature may be a quick response (QR) code or a near-field communication (NFC) tag. A QR code may be printed on a sticker or other medium and attached to the interactive public display device 110, or may be printed or painted directly on the interactive public display device 110. An NFC tag, which is, typically, made of a conductive material such as copper, may be embedded in a sticker or other medium and attached to the surface of the interactive public display device 110, or may be embedded directly into the interactive public display device 110. In some instances, the interactive public display device 110 may include multiple synchronization features of different types. For example, the interactive public display device 110 may include both a QR code and an NFC tag, disposed separately from one another on the interactive public display device 110 or disposed on top of one another on the interactive public display device 110.

The synchronization feature is configured to enable a mobile device, running the mobile wayfinding application 120, to synchronize with the interactive public display device 110, typically, by scanning the synchronization feature. Preferably, the synchronization feature is encoded with the identifier of the interactive public display device 110.

For example, the identifier may be included in a unique uniform resource locator (URL) corresponding to the interactive public display device 110. In one embodiment, the mobile device can be synchronized with the interactive public display device 110 to load a state of the interactive public display device 110 to the mobile device by referencing the unique URL. When the interactive public display device 110 is synchronized with the mobile device from within the operating system of the mobile device, e.g., by using a QR reader application or a built-in NFC reader, the URL directs to the appropriate download page for the mobile wayfinding application 120, e.g., an application or "app" store. When the interactive public display device 110 is synchronized with the mobile wayfinding application 120 of the mobile device from within the mobile wayfinding application 120, e.g., by using an in-app reader/scanner, the mobile wayfinding application 120 loads the state of the interactive public display device 110 through the back end system 102 by referencing the unique URL.

In another embodiment, the mobile device can receive route information from a facility device 503 by referencing the unique URL (as described with reference to FIGS. 5 and 6, below) In this embodiment, for example, a user of the mobile device 501 can provide a destination location and a starting location to the facility device 503 over a communications network 504. In another example, a user of the mobile device 501 can provide a destination location and a starting location to a user of the facility device 503 (e.g. orally or using a wireless communication technology (e.g. SMS, etc.)). In this example, the user of the facility device 503 can input the destination location and the starting location into the facility device 503.

Facility device 503 has a facility application 511 for communication to a backend system 502. Backend system 502 can determine a route from the starting location to the destination location, link the route to the unique URL and transmit the unique URL to either or both of the facility device 503 or the mobile device 501. In the embodiment where the backend system 502 transmits the unique URL directly to the mobile device 501, the facility device 503 can provide the backend system 502 with an identifier of the mobile device 501 (e.g. phone number or the like) to use to transmit the unique URL to the mobile device 501. In the embodiment where the backend system 502 transmits the unique URL to the facility device 503, either a user of the facility device 503 can transmit the unique URL to the mobile device 501 or the facility device 503 can automatically transmit the unique URL to the mobile device 501 based on, for example, the starting location and the destination location.

With reference to FIG. 2, an exemplary embodiment of the interactive public display device 210 is designed as a free-standing kiosk. The interactive public display device 210 includes an enclosure 211, i.e., a housing, a touch-screen display 212 supported by the enclosure 211, a synchronization feature 213 on the enclosure 211, as well as a processor (not shown), memory (not shown), and a network interface card (not shown) within the enclosure 211. In the illustrated embodiment, the touch-screen display 212 has a substantially vertical orientation, which allows an additional display to be included on an opposite side of the interactive public display device 210. In other words, a non-interactive public display device may be integrated with the interactive public display device 210.

With reference again to FIG. 1, the interactive public display device 110 runs a public wayfinding application, which may be a web application running in a web browser and hosted by the back end system 102 or a native application stored in the memory of the interactive public display device 110. The interactive public display device 110, running the public wayfinding application, presents a public user interface, which is adapted for simultaneous viewing by multiple users, on its display. The interactive public display device 110 displays information relating to the facility and the facility units, including wayfinding information, via the public user interface, and receives user requests for such information via the public user interface.

The wayfinding information that is displayed includes a facility map 182 showing the facility units. The facility map 182 illustrates the layout of the facility units within the facility, facilitating navigation through the facility. The wayfinding information also includes routes from a start location to a destination location on the facility map 182 and, optionally, corresponding directions. Typically, the wayfinding information further includes a facility directory listing the facility units. The facility directory lists the facility units by name in an organized manner, e.g., alphabetically, by category, and/or by location.

The representation of the wayfinding information in the public user interface is optimized for public viewing. Typically, the whole facility map 182 or a complete floor of the facility map 182, i.e., a floor map, is displayed on a single screen of the public user interface. When the facility has more than one floor, the public user interface may cycle through multiple floor maps over time. Preferably, a whole facility map 182 or floor map is always displayed, even while a user is interacting with the interactive public display device 110, so that other users may use the map for navigation.

Typically, the whole facility directory or a complete category of the facility directory, i.e., a directory category, is displayed on the same screen of the public user interface. When the directory is organized by category, the public user interface may cycle through multiple directory categories over time. Preferably, a whole facility directory or directory category is always displayed, even while a user is interacting with the interactive public display device 110, so that other users may use the directory for navigation. Also preferably, the facility units are labeled with an identifier on the facility map 182 and listed with the same identifier in the facility directory.

In one embodiment, a user request for wayfinding information involves a user selection of a facility unit as a destination location, via the public user interface of the interactive public display device 110. Typically, the user selection of a facility unit as a destination location via the public user interface is received by detecting a user touch on a facility unit on the facility map 182, i.e., an interactive facility map 182, or in the facility directory, i.e., an interactive facility directory, displayed on a touch-screen display. Alternatively, the user selection may be received from a separate input device, e.g., a touchpad, one or more keys, and/or a keyboard. The facility unit selected as the destination location is highlighted on the facility map 182, and a route from the interactive public display device 110, as the start location, to the facility unit selected as the destination location is displayed on the facility map 182.

Optionally, corresponding point-to-point directions may be displayed along with more detailed map views on the same screen of the public user interface. Typically, additional information relating to the facility unit selected as the destination location is also displayed, such as a profile, a photograph, directory information, e.g., a phone number and/or an address, opening hours, event information, promotional information, e.g., an advertisement and/or a marketing message, and/or a promotional item, e.g., a digital coupon.

In some instances, a user selection of a directory category may also be received. Typically, the user selection of a directory category is received by detecting a user touch on a heading of the facility directory. Alternatively, the user selection may be received from a separate input device, e.g., a touchpad, one or more keys, and/or a keyboard. When a directory category is selected, those facility units categorized as belonging to that directory category are displayed. For example, a user may select the directory category "shoes", and those facility units categorized as shoe stores may be displayed.

Accordingly, the public user interface has a selection state including a user selection of a destination location and, in some instances, a user selection of a directory category. Preferably, the public user interface has a selection state including at most two user selections, i.e., at most two layers of statefulness relating to user selections.

The interactive public display device 110 may also display real-time notifications, e.g., notifications of events, notifications of promotions, and/or alerts.

The non-interactive public display device 140 is physically similar to the interactive public display device 110, but lacks user interactivity. In general, the non-interactive public display device 140 includes a non-touch display, e.g., a standard LCD display. The non-interactive public display device 140 may be installed as a free-standing unit or may be integrated with the interactive public display device 110. For example, a non-interactive public display device 140 may be integrated with the interactive public display device 210 of FIG. 2, sharing the same enclosure 211, processor, memory, and network interface card. The noninteractive public display device 140 displays wayfinding and/or promotional information, typically, a static facility map 182, a static facility directory, and/or an advertisement.

Like the interactive public display device 110, preferably, the non-interactive public display device 140 is provided with an identifier which uniquely identifies the interactive public display device 140, and includes a synchronization feature encoded with the identifier, e.g., a QR code or an NFC tag referencing the physical location of the non-interactive public display device 140.

The mobile wayfinding application 120 runs on a mobile device, which is a hand-held, portable computer device, such as a mobile phone, e.g., a smartphone, a personal digital assistant (PDA), or a tablet computer. In addition to a processor, memory, and a network interface card, the mobile device includes a display and, preferably, also includes a synchronization device.

The display of the mobile device is a small-screen display adapted for personal v1ewmg. For example, the display may have a diagonal screen size of less than 15" (38 cm). Typically, the display is a touch-screen display. In some instances, the mobile device may include a separate input device, e.g., a touchpad, one or more keys, and/or a keyboard, in addition to or instead of a touch-screen display.

Typically, the synchronization device is a scanning, i.e., reading, device, and the mobile device is configured to scan the synchronization feature, in order to read the synchronization feature. For example, the synchronization device may be a camera, an NFC transceiver, a Bluetooth transceiver, or a WiFi transceiver. In some instances, the mobile device may include multiple synchronization devices of different types. For example, the mobile device may include both a camera and an NFC transceiver.

With reference to FIG. 3, an exemplary embodiment of the mobile device 320 is a conventional smartphone. The mobile device 320 includes a housing 321, a touch-screen display 322 supported by the housing 321, and a home key 323 on the housing 321, as well as a processor (not shown), memory (not shown), a network interface card (not shown), and a synchronization device 324, e.g., an NFC transceiver, within the housing 321.

With reference again to FIG. 1, the mobile wayfinding application 120 is, typically, a native application stored in the memory of the mobile device and running in the operating system of the mobile device. In general, different versions of the mobile wayfinding application 120 are written for different mobile platforms, in the appropriate languages, using the appropriate software development kits (SDKs) and frameworks.

The mobile device, running the mobile wayfinding application 120, presents a mobile user interface, which is adapted for viewing by a single user, on its display. The mobile user interface and the public user interface have similar appearances, functions, and features, so that users are able to easily transition between the user interfaces. The mobile device displays information relating to the facility and the facility units, including wayfinding information, via the mobile user interface, and receives user requests for such information via the mobile user interface.

The wayfinding information that is displayed via the mobile user interface on the mobile device is, generally, the same as that displayed via the public user interface on the interactive public display device 110, but the representation of the wayfinding information in the mobile user interface is optimized for personal viewing on a small-screen display, rather than public viewing on a large-screen display. The mobile user interface offers additional content, and additional levels of screens, menus, and interactions.

Typically, a list of multiple facilities is displayed on an initial screen of the mobile user interface. A user selection of a facility is received by detecting a user touch on a touch-screen display or from a separate input device. A facility map 182, a facility directory, and facility events associated with the selected facility may then be accessed.

Typically, the facility map 182 or a portion thereof is displayed on a single screen of the mobile user interface, and the facility map 182 may be manipulated through finger gestures. For example, the facility map 182 may be moved by a single-finger gesture, or magnified or reduced by a two-finger gesture. Preferably, the facility units are displayed with markers, which allow a user selection of a facility unit to be made by a single-tap gesture on the corresponding marker. Typically, the facility directory or a portion thereof is displayed on a different screen of the mobile user interface, and the facility directory may be manipulated through finger gestures. For example, the facility directory may be scrolled by a single-finger gesture.

A user request for wayfinding information involves a user selection of a facility unit as a destination location, via the mobile user interface. Typically, the user selection of a facility unit as a destination location is received by detecting a user touch on a facility unit on the facility map 182 or in the facility directory displayed on a touch-screen display. Alternatively, the user selection may be received from a separate input device, e.g., a touchpad, one or more keys, and/or a keyboard. The facility unit selected as the destination location is highlighted on the facility map 182.

Typically, additional information relating to the facility unit selected as the destination location is also displayed, such as a profile, a link to a webpage or a social media page, a photograph, directory information, e.g., a phone number and/or an address, opening hours, event information, promotional information, e.g., an advertisement and/or a marketing message, and/or a promotional item, e.g., a digital coupon. Additionally, information generated by other people, e.g., friends on social media sites, or friends from within the mobile wayfinding application 120, may be displayed in the mobile user interface. Preferably, each facility unit has its own profile page where the additional information may be accessed.

For routing to the facility unit selected as the destination location without synchronizing the mobile device, a user selection of a facility unit as a start location is also received, via the mobile user interface. Typically, the user selection of a facility unit as a start location is received by detecting a user touch on a facility unit in the facility directory displayed on a touch-screen display or by searching for an alphanumeric string, e.g., by using a real-time intelligent search, input from an on-screen or physical keyboard. A route from the facility unit selected as the start location to the facility unit selected as the destination location is then displayed on the facility map 182. Optionally, corresponding point-to-point directions may also be displayed. For example, the point-to-point directions may accessed by sliding between points on a progress bar displayed below the facility map 182. As each point is reached, a corresponding step is illustrated on the facility map 182 and also displayed as text.

Preferably, the wayfinding system 100 allows a user to synchronize or "sync" their mobile device, running the mobile wayfinding application 120, with the interactive public display device 110. For example, a user may use a synchronization device on their mobile phone to interface with a synchronization feature on the interactive public display device 110. Preferably, the mobile wayfinding application 120 includes an in-app reader/scanner.

Upon synchronization, the start location is updated to the interactive public display device 110, and the destination location is updated to a facility unit selected on the interactive public display device 110. In general, the selection state of the mobile wayfinding application 120 is updated to the selection state of the interactive public display device 110. In other words, the mobile wayfinding application 120 reflects what is displayed and selected on the interactive public display device 110. Thus, advantageously, the mobile wayfinding application 120 does not have to rely on signal-based localization of the mobile device for routing and does not have to rely on printouts to provide a record of wayfinding information. For example, if a shopper at a mall uses the interactive public display device 110 to select a particular store, and to obtain a route to the store and other relevant information about the store, the shopper can synchronize their mobile phone with the interactive public display device 110 to load the same route and information into the mobile wayfinding application 120. Optionally, upon synchronization, the mobile device may also receive a promotional item, e.g., a digital coupon, displayed on the interactive public display device 110.

In some instances, the mobile device, running the mobile wayfinding application 120, may be synchronized with the non-interactive public display device 140 in a similar manner to update the start location to the non-interactive public display device 140.

Figure 4:
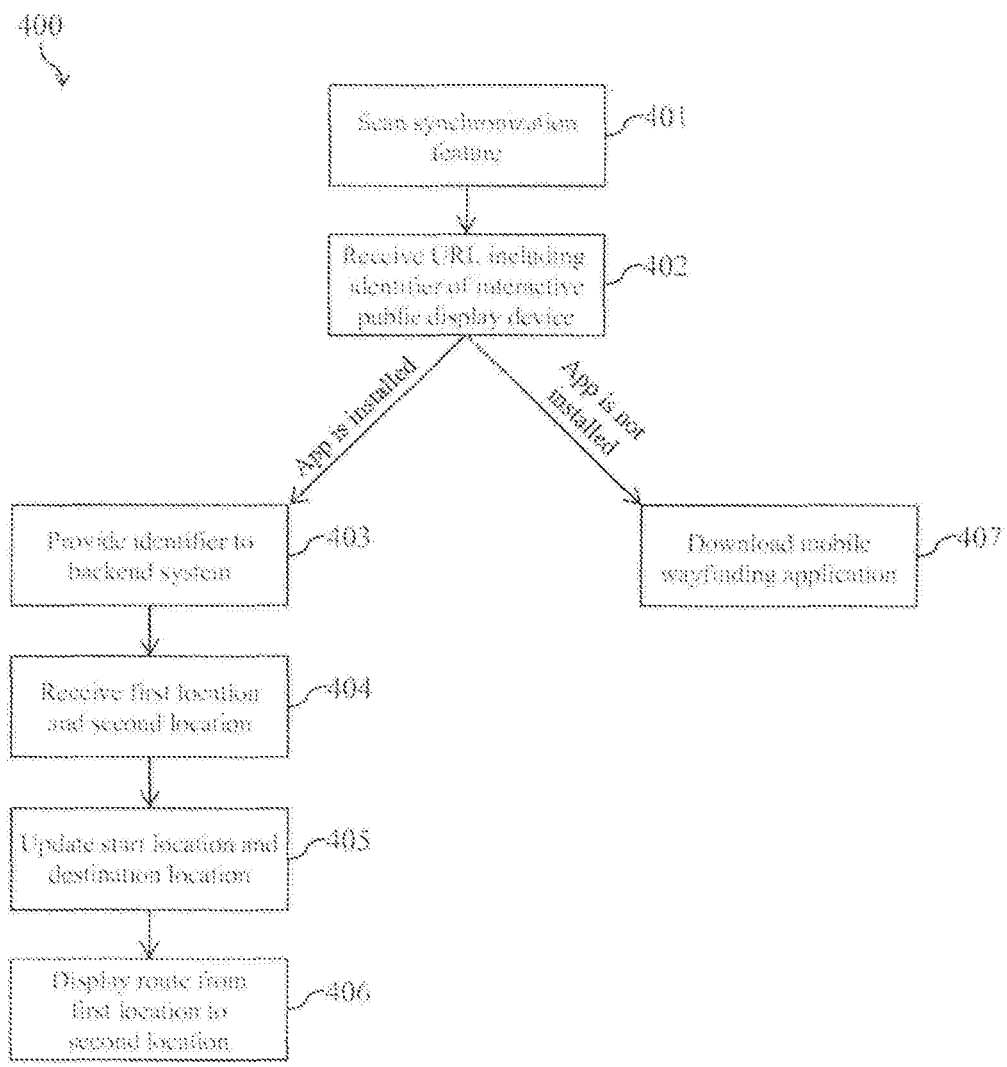
FIG. 4 is flow diagram of an exemplary synchronization method, in accordance with an embodiment.

With reference to FIG. 4, in an exemplary embodiment of a synchronization method 400, a mobile device scans a scannable synchronization feature on an interactive public display device, by means of a scanning device, in a first step 401. The interactive public display device is located at a first location within a facility and has been used to select a facility unit as a second location, i.e., has a current selection state including a user selection of the second location. Accordingly, the interactive public display device displays a route from the first location to the second location, via the public user interface. In a second step 402, the mobile device receives a unique URL including an identifier of the interactive public display device.

If the mobile device already has the mobile wayfinding application installed, the mobile device provides the identifier to the backend system, via the URL, in a third step 403. In return, the mobile device receives the first location and the second location from the backend system, in a fourth step 404. In a fifth step 405, the mobile device updates its start location to the first location and its destination location to the second location in the mobile wayfinding application. Accordingly, the mobile device displays the route from the first location to the second location, via the mobile user interface, in a sixth step 406.

If the mobile device does not have the mobile wayfinding application 120 installed, the URL directs the mobile device to download the mobile wayfinding application 120 from an application store, in an alternative step 407.

The mobile device may also display real-time notifications, e.g., notifications of events, notifications of promotions, and/or alerts.

With reference again to FIG. 1, the web wayfinding application 150 runs in a web browser on a computer device, e.g., a desktop computer or laptop computer, and is hosted by the backend system 102. The web wayfinding application 150 is, generally, similar to the mobile wayfinding application 120, but is designed for a standard computer device, rather than a mobile device. Accordingly, the representation of the wayfinding information is optimized for personal viewing on a standard-screen non-touch display. User selections are received from an input device, e.g., a mouse or a keyboard.

The content and analytics dashboard 130 is, typically, a web application running in a web browser on a computer device, e.g., a desktop computer or laptop computer, and hosted by the backend system 102. The content and analytics dashboard 130 is a management application, which allows authorized users, e.g., facility managers, to manage and administer the wayfinding system 100. Advantageously, by using the content and analytics dashboard 130, authorized users are able to manage and administer all of the user-facing components 101 in one place and at the same time.

The content and analytics dashboard 130 includes a content module, which enables authorized users to update content stored in the CMS 160 in the backend system 102. Information relating to the facility and the facility units can easily be accessed and changed, e.g., revised, added, or removed. Updates are pushed to the interactive public display device 110, the mobile wayfinding application 120, and the web wayfinding application 150 in real time. For example, a hospital administrator may use the content and analytics dashboard 130 to update contact information for a hospital department on all interactive public display devices 110 situated within the hospital and on all versions of the mobile wayfinding application 120.

The content and analytics dashboard 130 also includes an analytics module, which enables authorized users to receive and view analytics from the analytics database system 170 in the backend system 102. Analytics relating to user interactions with the interactive public display device 110, the mobile wayfinding application 120, and the web wayfinding application 150, e.g., user selections or "hits", searches, dates, types of mobile device, and/or movement patterns represented as heat maps, may be accessed and viewed in real time. In particular, heat maps may be generated manually within the analytics database system 170 or by the GIS 180, by plotting individual paths taken by each user and overlaying color values onto the plot based on the number of overlayed paths.

Typically, the analytics describe and compare user interactions by facility unit, e.g., hits per facility unit, or by directory category, e.g., hits per category, over a particular time period, e.g., in tables, charts, and/or graphs. The analytics may be received in the form of a report, e.g., a monthly report or an on-demand report. For example, a hospital administrator may use the content and analytics dashboard 130 to view heat maps of visitor/patient movement. For another example, a mall manager may use the content and analytics dashboard 130 to query how many shoppers selected a particular store or searched for washrooms by using a particular type of mobile device over a particular time period.

The backend system 102, typically, includes multiple backend devices, e.g., servers. Typically, the backend system 102 includes at least a database server and a hosting server. In some instances, the backend system 102 also includes a content distribution network (CDN). The CMS 160 and the analytics database system 170 are hosted by the backend system 102. The GIS 180 may be hosted internally by the backend system 102 or supplied externally.

The CMS 160 is a database application, typically, implemented as a web service. The CMS 160 stores content, including information relating to the facility and the facility units, handles updates to the content received from the content and analytics dashboard 130, and provides the content to the interactive public display device 110, the mobile wayfinding application 120, and the web wayfinding application 150. For example, the CMS 160 may be a no structured query language (NoSQL) database application. The content stored in the CMS 160 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units is tied to a related entry in the facility metadata 183 stored in the GIS 180. This allows larger, less frequently accessed files to be stored in the CMS 160, rather than the GIS 180.

The CMS 160 also stores the identifier of the interactive public display device 110 together with the location of the interactive public display device 110, and the current selection state of the interactive public display device 110. Typically, the CMS 160 stores identifiers, locations, and current selection states for multiple interactive public display devices 110. In some instances, the CMS 160 also stores identifiers and locations for multiple non-interactive public display devices 140.

When a mobile device, running the mobile wayfinding application 120, sends an identifier of an interactive public display device 110 to the back end system 102 upon synchronization with that interactive public display device 110, the identifier is received by the CMS 160. The CMS 160 uses the identifier to identify the interactive public display device 110, typically, among the multiple interactive public display devices, and to retrieve the location and the current selection state for the interactive public display device 110. The CMS 160 then provides the location and the current selection state of the interactive public display device 110 to the mobile device, which updates its location and selection state accordingly. Typically, the selection state includes a user selection of a destination location.

The analytics database system 170 is also a database application, typically, implemented as a web service. The analytics database system 170 stores all user interactions with the interactive public display device 110, the mobile wayfinding application 120, and the web wayfinding application 150, e.g., user selections or "hits", searches, dates, types of mobile device, and/or movement patterns represented as heat maps, in real time, and generates analytics relating to the user interactions. Advantageously, because user interactions are recorded for several different user-facing components 101, a relatively large sample size is obtained. Typically, user interactions are stored in a raw format and preset metrics are passively generated. For example, all hits on the interactive public display device 110 and the mobile wayfinding application 120 at a mall may be recorded, and a table listing the number of hits per store in the current month may be generated, for viewing in the content and analytics dashboard 130.

The GIS 180 is, typically, a representational state transfer (REST)-ful application programming interface (API). The GIS 180 includes routing algorithms 181, facility maps 182, and associated facility metadata 183. The GIS 180 stores the facility maps 182 and the facility metadata 183, handles updates to the facility maps 182 and the facility metadata 183, and provides the facility maps 182 and the facility metadata 183 to the interactive public display device 110, the mobile wayfinding application 120, and the web wayfinding application 150. Typically, the GIS 180 serves the facility maps 182, e.g., as PNG files, and the facility metadata 183, e.g., as JSON/XML files, over the web. The facility metadata 183 is customizable for the type of facility, and may include digital representations of paths, polygons encapsulating facility units, nodes corresponding to facility locations, identifiers for each facility unit, and qualitative metadata 183, such as the type of path, e.g., hallway or dirt trail.

The GIS 180 also uses the routing algorithms 181 to calculate routes and provides the routes to the interactive public display device 110, the mobile wayfinding application 120, and the web wayfinding application 150. Typically, the routing calculations output a JSON/XML list of node or polygon identifiers representing a complete path, which the interactive public display device 110, the mobile wayfinding application 120, and the web wayfinding application 150 will interpret and display. The output may also include points of interest and other metadata 183, such as total estimated travel time based on type of path and real-time traffic.

Figure 5:
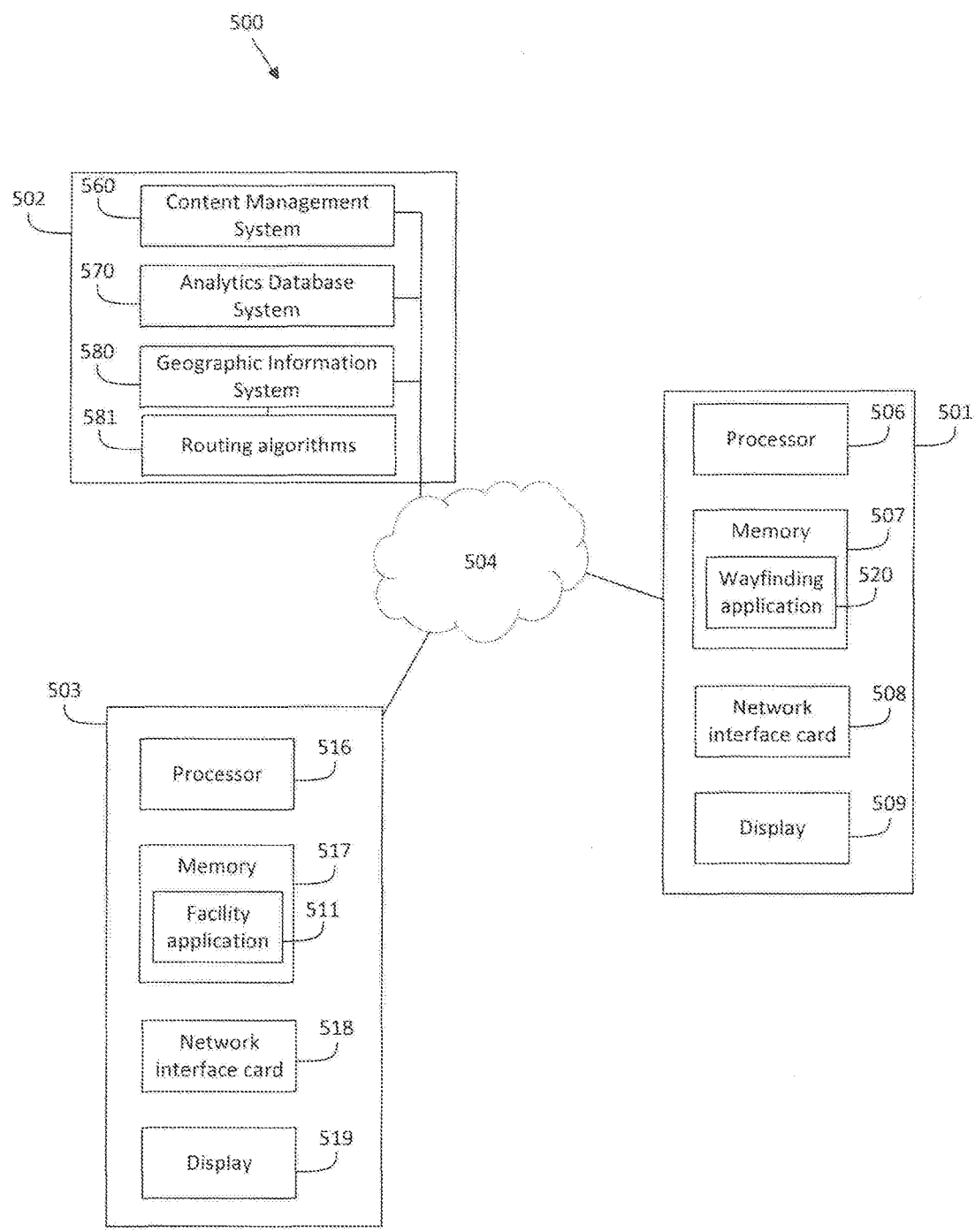
FIG. 5 is a block diagram of an exemplary facility wayfinding system, in accordance with another embodiment.

With reference to FIG. 5, an exemplary embodiment of the wayfinding system 500 is shown. Wayfinding system 500 includes mobile device 501 and facility device 503, supported by a common backend system 502. Mobile device 501, facility device 503 and backend system 502 are operatively connected via network 504, (e.g. the Internet). It should be noted that there can be more than one mobile device 501 and/or more than one facility device 503 operatively connected at a time within system 500. The individual connections may be wired or wireless connections.

In the system 500, mobile device 501, facility devices 503 and backend system 502 may communicate asynchronously, for example, by using an implementation of the WebSocket protocol, such as Socket.IO. In this example, updates may be sent from the backend system 502 to each of mobile device 501 and facility devices 503 in real-time as interrupts, i.e., without polling. Likewise, user interaction data may, preferably, be sent from each of the mobile devices 501 and the facility device 503 to the backend system 502 in real-time as interrupts, i.e., without polling. Mobile device 501 may also communicate with the facility devices 503 over network 504 (e.g. Wi-Fi, Bluetooth™, etc.)

Mobile device 501 is generally a hand-held, portable computer device such as a mobile phone (e.g., a smartphone, a personal digital assistant (PDA), or a tablet computer). In addition to a processor 506, memory 507, and a network interface card 508, the mobile device 501 includes a display 509. Display 509 is adapted for personal viewing. For example, the display 509 may have a diagonal screen size of less than 15" (38 cm). Typically, display 509 is a touch-screen display. In some instances, the mobile device 501 may include a separate input device, e.g., a touchpad, one or more keys, and/or a keyboard, in addition to or instead of a touch-screen display.

Mobile device 501 may be a conventional smartphone (as shown in FIG. 3 and described above). In one embodiment, mobile device 501 has wayfinding application 520 as a native application stored in the memory 507 of mobile device 501 and running in the operating system of the mobile device 501. In general, different versions of the mobile wayfinding application 520 are written for different mobile platforms, in the appropriate languages, using the appropriate software development kits (SDKs) and frameworks.

Mobile device 501, running the mobile wayfinding application 520, presents a mobile user interface (not shown), which is adapted for viewing by a single user, on display 509. The mobile user interface displays information relating to the facility and the facility units, including wayfinding information, and can receive user requests for such information via the mobile user interface.

Backend system 502 includes a content management system (CMS) 560, an analytics database system 570, and a geographical information system (GIS) 580.

Facility device 503 hosts a facility application 511. In general, facility device 503 includes a processor 516, memory 517, a network interface card 518 and a display 519. Facility device 503, specifically the processor 516 thereof, is configured by facility application 511 to execute the actions described hereafter. Facility application 511 is generally embodied in non-transitory computer-readable storage media and/or device memories and is executable by processor 516.

Facility device 503 can be situated within the facility or can be situated outside of the facility. Typically, facility device 503 is provided with an identifier, e.g., a serial number, which uniquely identifies the facility device 503 among multiple facility devices 503.

Facility device 503 can receive a user request for wayfinding information including a start location and a destination location from mobile device 501. In one embodiment, a user request for wayfinding information involves a user providing a facility unit as a destination location to facility application 511 of facility device 503 as text information (e.g. via a text message, SMS message, electronic mail or the like) or audio information (e.g. as oral communication) via the mobile device 501. Typically, in this embodiment, the user also provides the starting location as text information or as audio information to a user of facility application 511 of facility device 503. Alternatively, the starting location can also be provided to facility application 511 of facility device 503 as GPS co-ordinates from the wayfinding application 520 by the mobile device (e.g. the co-ordinates received from a receiver of the mobile device). The user of mobile device 501 can provide the destination location and the start location electronically as text information (e.g. Email, SMS, etc.) through wayfinding application 520 or through any other application that can provide transmission of text information.

In another embodiment, the user request for wayfinding information involves a user of mobile device 501 providing a facility unit as a destination location to facility device 503 through wayfinding application 520. In this embodiment, the user of mobile device 501 can also provide a start location of mobile device 501 (e.g. using a GPS of mobile device 501) to facility device 503. The user of mobile device 501 can input the destination location and, optionally, the start location into mobile wayfinding application 520 directly and wayfinding application 520 can transmit the destination location and the start location to facility application 511 of facility device 503 automatically.

Once the start location and the destination location are received by facility application 511, facility application 511 provides the start location and the destination location to backend system 502. GIS 580 of backend system 502 uses routing algorithms 581 to calculate a route or routes between the starting location and the destination location. Backend system 502 then provides the route(s) to at least one of facility device 503 and/or mobile device 501 (e.g. to facility application 511 and/or wayfinding application 520, respectively). Alternatively, in another embodiment, backend system 502 can provide the route(s) to at least one of facility device 503 and/or mobile device 501 for viewing in a third party application (e.g. in a browser application) or can provide instructions for at least one of facility device 503 and/or mobile device 501 to retrieve the route(s) from backend system 502 using a third party application (e.g. in a browser application). As described above, typically the routing calculations output a JSON/XML list of node or polygon identifiers representing a complete path, which the facility application 511 of facility device 503 and/or the mobile wayfinding application 520 of mobile device 501 will interpret and display. The output may also include points of interest and other metadata such as total estimated travel time based on type of path and real-time traffic.

Once received by the wayfinding application 520 of mobile device 501 (either directly from the backend system 502 or through the facility application 511 of facility device 503), the start location and the destination location on the wayfinding application 520 can be updated to a facility unit (e.g. as selected on facility device 503 and provided to backend system 502).

In general, the selection state of the wayfinding application 520 can be updated to the selection state of the facility application 511 on facility device 503 through receipt and activation of a URL over wireless network 504 from backend system 502, either directly or through facility device 503. Upon receipt at mobile device 501, a user of mobile device 501 can activate the unique URL, view the routing information and reflect on what facility units are selected and displayed on the mobile device 501. Thus, advantageously, the mobile wayfinding application 520 does not have to rely on signal-based localization of the mobile device 501 for routing and does not have to rely on printouts to provide a record of wayfinding information.

In one example embodiment, if a shopper at a mall desires to obtain a route to a store and other relevant information about the store, the shopper can use a mobile device 501 to contact facility device 503 (e.g. using either wayfinding application 520 or another communication mechanism (e.g. text message) as described above) to provide the facility device 503 with the current location (e.g. a start location) of the mobile device 501 and a destination location. The facility device 503 can forward the start location and the destination location to backend system 502 for the backend system 502 to determine a route or routes between the current location and the destination location. The backend system 502 can then provide the facility application 511 or the wayfinding application 520 with a URL for accessing the route(s).

Optionally, upon receiving the URL, the mobile device 501 may also receive a promotional item, e.g., a digital coupon, associated with the store (e.g. facility unit) at the destination location or another store (e.g. facility unit).

Figure 6:
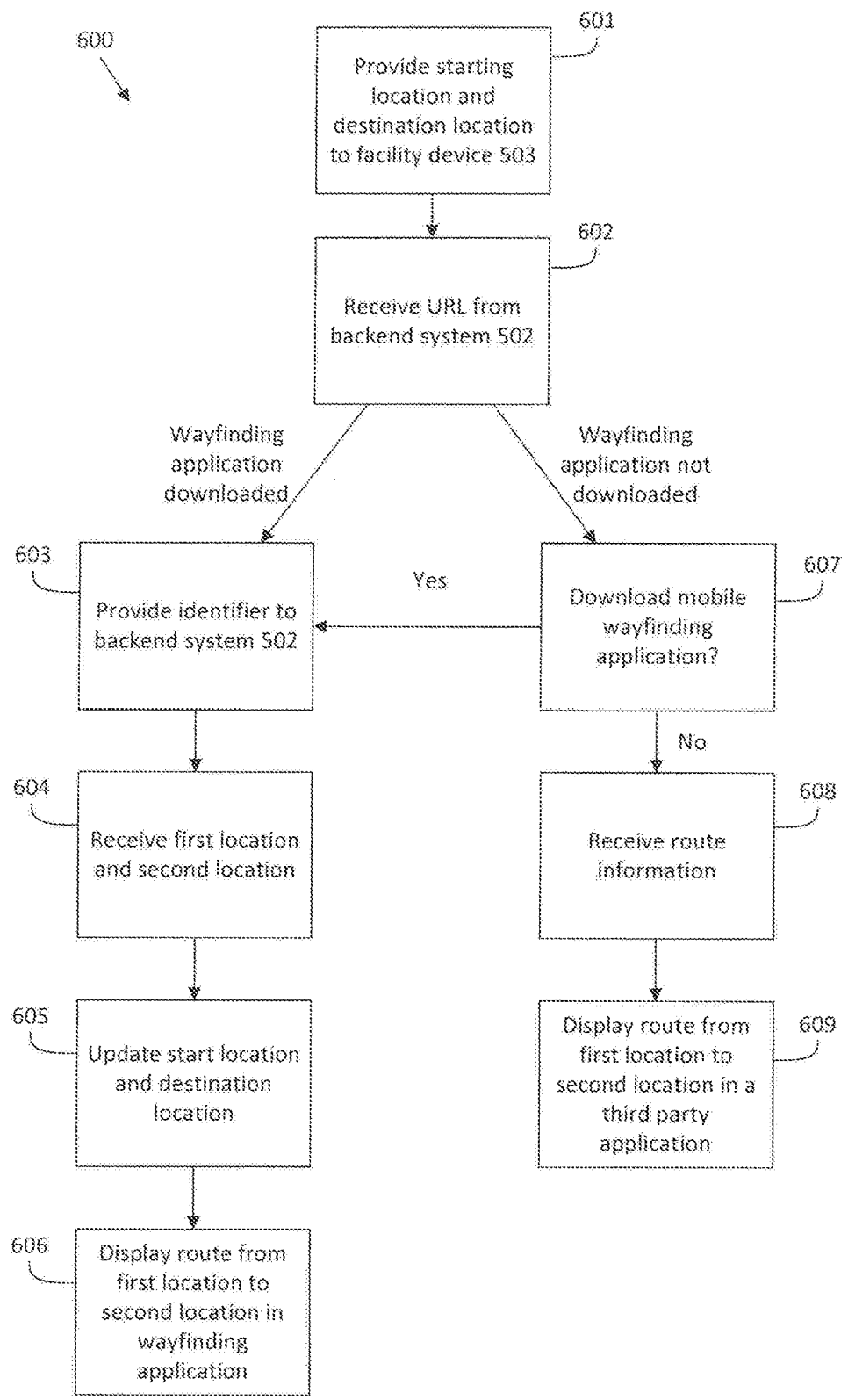
FIG. 6 is a flow diagram of an exemplary wayfinding method, in accordance with another embodiment.

With reference to FIG. 6, in an exemplary embodiment of a method 600, a user of a mobile device 501 provides a starting location and a destination location to facility device 503 (e.g. to a user of facility device 503 or directly to facility device 503), in a first step 601. A user of facility device 503 may select a facility unit (e.g. via a user interface showing the facility and facility units) as a second location based on the destination location provided such that facility device 503 has a selection state including a first location and a second location. The facility device can forward the first location and the second location to backend system 502 which determines route information (e.g. a route from the first location to the second location) and sends the route information to the facility device 503 for display on the facility device 503. The backend system also generates a unique URL linked to the route information and transmits the unique URL for receipt by the mobile device 501 (either directly from the backend system 502 or through facility device 503).

If the mobile device 501 already has the mobile wayfinding application 520 installed, the mobile device 501 provides the identifier to the backend system 502, via the URL, in a step 603. In return, the mobile device 501 receives the first location and the second location from the backend system 502, in a step 604. In a step 605, the mobile device 501 updates its start location to the first location and its destination location to the second location in the mobile wayfinding application 520. Accordingly, the mobile device 501 displays the route from the first location to the second location, using the wayfinding application 520, via the mobile user interface in a sixth step 606.

If the mobile device does not have the mobile wayfinding application 520 installed, after the step 602, the URL can direct the mobile device 501 to download the wayfinding application 520 from an application store in an alternative step 607. If the user chooses to download the wayfinding application 520 at step 607, the method will return to step 603 and continue as previously described.

If the user of the mobile device 501 does not choose to download the wayfinding application 520 at step 607, the mobile device 501 may receive the route information from the backend system 502 in a step 608 and display the route information as a route from the first location to the second location using the a third party application (e.g. a browser application), via the mobile user interface, in a step 609.

While the above description provides examples of one or more apparatus, methods, or systems, it will be appreciated that other apparatus, methods, or systems may be within the scope of the claims as interpreted by one of skill in the art.

The invention claimed is:

1. A wayfinding system for a facility including multiple facility units, the wayfinding system comprising:
   a facility device configured to:
      present a user interface on a display of the facility device;
      display a facility map showing facility units via the public user interface;
      receive a first location and a second location via the user interface, the second location corresponding to a facility unit of the facility units;
      display a route from the first location to the second location on the facility map via the user interface; and
      receive a uniform resource locator (URL) from a backend system comprising an identifier associated with the route; and
   a mobile device configured to:
      present a mobile user interface on a display of the mobile device;
      receive the URL from the facility device;
      via the URL, provide the identifier to the backend system;
      receive, from the backend system, the first location and the second location;
      update a start location to the first location and a destination location to the second location;
      display the facility map via the mobile user interface; and
      display the route from the start location to the destination location on the facility map via the mobile user interface.

2. The wayfinding system of claim 1, wherein the facility is an indoor facility.

3. The wayfinding system of claim 1, wherein the facility device is further configured to provide a promotional item relating to the facility unit via the user interface; and
   wherein the mobile device is further configured to receive the promotional item from the facility device.

4. The wayfinding system of claim 1, further comprising:
   the backend system, wirelessly connected to the facility device and the mobile device, configured to:
      provide the facility map to the facility device and the mobile device;
      provide the route from the first location to the second location to the facility device; and provide the route from the start location to the destination location to the mobile device.

5. The wayfinding system of claim 4, wherein the backend system is further configured to store identifiers, locations, and current selection states for the facility device.

6. The wayfinding system of claim 4, wherein the backend system is further configured to provide the first location and the second location to the mobile device upon receipt of the identifier.

7. The wayfinding system of claim 6, wherein the backend system is further configured to:
store identifiers, locations, and current selection states for the facility device; and
use the identifier to identify the facility device and to retrieve the current selection state for the facility device, wherein the current selection state includes the first location and the second location.

8. The wayfinding system of claim 4, further comprising:
a geographical information system (GIS), hosted internally by the backend system or supplied externally to the backend system, configured to store the facility map and associated facility metadata; and the destination location.

9. The wayfinding system of claim 4, wherein the public display device is further configured to display a facility directory, listing the facility units, via the public user interface;
wherein the mobile device is further configured to display the facility directory, via the mobile user interface; and
wherein the backend system is further configured to provide the facility directory to the public display device and the mobile device.

10. The wayfinding system of claim 9, wherein the public display device is configured to display the facility map and the facility directory on a same screen of the public user interface; and wherein the mobile device is configured to display the facility map and the facility directory on different screens of the mobile user interface.

11. The wayfinding system of claim 9, wherein the display of the public display device is a touch-screen display; and wherein the public display device is configured to receive the user selection by detecting a user touch on a facility unit on the facility map or in the facility directory.

12. The wayfinding system of claim 1, wherein the identifier uniquely identifies the public display device among multiple interactive public display devices.

13. The wayfinding system of claim 1, wherein the facility device is configured to provide the first location and the second location to the backend system.

14. The wayfinding system of claim 13, wherein the facility device is configured to receive the first location and the second location as a user selection.

15. The wayfinding system of claim 13, wherein the backend system is configured to provide the first location and the second location to the mobile device upon receipt of the identifier.

16. A non-transitory computer-readable storage medium having stored thereon computer-executable instructions that, when executed by a processor of a mobile device, cause the processor of a mobile device to execute a mobile wayfinding application for integration into a wayfinding system for a facility including multiple facility units, wherein the mobile wayfinding application causes the mobile device to:

present a mobile user interface on a display of the mobile device;
display a facility map, showing the facility units, via the mobile user interface;
display a route from a start location to a destination location on the facility map, via the mobile user interface;
receive a uniform resource locator (URL), the URL comprising an identifier associated with the route to obtain, from a backend system, a first location and a second location, wherein the mobile device is situated at the first location within the facility, and the second location comprises a location of a facility unit selected by a user of the mobile device; and
update the start location to the first location and the destination location to the second location upon obtaining the first location and the second location from the backend system.

17. A facility device for a facility including multiple facility units, the facility device configured to:
present a user interface on a display of the facility device;
display a facility map showing facility units via the public user interface;
receive a first location and a second location via the user interface, the second location corresponding to a facility unit of the facility units;
display a route from the first location to the second location on the facility map via the user interface; and
receive a uniform resource locator (URL) from a backend system comprising an identifier associated with the route.

18. The facility device of claim 17, wherein the facility device is wirelessly connected to a mobile device, wherein the mobile device is configured to:
present a mobile user interface on a display of the mobile device;
receive the URL from the facility device;
via the URL, provide the identifier to the backend system;
receive, from the backend system, the first location and the second location;
update a start location to the first location and a destination location to the second location;
display the facility map via the mobile user interface; and
display the route from the start location to the destination location on the facility map via the mobile user interface.

19. The facility device of claim 18, wherein the facility device is further configured to provide a promotional item relating to the facility unit via the user interface; and
wherein the mobile device is further configured to receive the promotional item from the facility device.

20. The facility device of claim 18, wherein the facility device is wirelessly connected to the backend system, and the backed system is configured to:
provide the facility map to the facility device and the mobile device;
provide the route from the first location to the second location to the facility device; and
provide the route from the start location to the destination location to the mobile device.

* * * * *